INVENTOR
ALLAN E. WILLIAMS
BY
Thomas W Brennan

United States Patent Office 3,296,802
Patented Jan. 10, 1967

3,296,802
LAMINATED MATERIAL AND ARRANGEMENT
THEREOF FOR USE IN PRESSURE VESSELS
Allan E. Williams, Elkton, Md., assignor to Thiokol
Chemical Corporation, Bristol, Pa., a corporation of
Pennsylvania
Filed Feb. 3, 1964, Ser. No. 342,306
22 Claims. (Cl. 60—256)

This invention relates to laminated structures suitable for use as pressure containing vessels.

More particularly, it relates to laminated pressure vessels of non-metallic and non-elastic materials useful for containing fluids under high pressure and at high temperature, wherein the arrangement of the laminations in the completed structure impart to the vessel unique and significantly increased pressure and temperature resisting capabilities, and simulate to a significant degree the action of elastic materials in a similar environment. Heretofore in fabricating laminated pressure vessels, the orientation of the laminations during construction thereof was either ignored as unimportant or random orientation was employed. Some structures, specifically glass fiber wrapped or wound tanks, rocket motor cases, nozzles and the like have been built wherein particular attention was paid to controlling the tension of the fibers (or fiber tape) during winding and to the orientation of the fibers or tape as winding proceeded, so as to bring about a finished product having relatively light weight and high strength. In these devices, however, weaknesses caused by high stress concentration at the points where end closures, connecting fittings and other, similar appurtenances were attached, presented problems and severely limited the use thereof. Also designers of light weight pressure vessels, especially light weight rocket motor cases and the like were limited as to pressure and temperature environment in which their device could be utilized. Thus, when confronted with the need to design light weight devices of this nature, for example, rocket motors and cases therefor, the designer was forced to resort to "beefing-up" or otherwise over-designing to achieve a practical, operable vehicle. All pressure vessels including those constructed of laminated materials, require some means for attaching end closures, fittings and other appurtenances. Usual devices for this purpose include lugs, adhesives, pinning, force fitting and other well known means, widely used in the art. Use of these means leaves the joints of attachment as the weakest member of the structure thereby resulting in added weight in the form of extra material or reinforcing members to structurally compensate for these weakened areas. Other disadvantages in the prior art devices also include tendencies of the laminations to peel away at, or near, the attachment areas because of bending loads or internal shear forces usually present in actual use.

Accordingly it is an object of this invention to provide a laminated pressure vessel suitable for use in containing fluid under high pressure and high temperature wherein the layers or laminations are uniquely oriented to provide a high strength, light weight structure.

Another object of this invention is to construct a laminated pressure vessel wherein the attachment of end closures thereto does not materially weaken the structure requiring extraneous reinforcing members.

Still another object of this invention is to provide a pressure vessel in the form of a rocket motor having laminated chamber walls, end closures and nozzles oriented in a manner to resist and contain high temperature fluids under high pressures.

An additional object of this invention is to provide a pressure vessel in the form of a composite rocket motor having an outer metal shell, laminated parts including an inner liner, end closures and a nozzle fitted thereto wherein the laminations are oriented to provide the motor with the additional capability of withstanding high temperature and high pressure for prolonged periods of operation.

A still further object is to provide a pressure vessel constructed of laminated materials which are economical and readily available wherein the laminations are oriented to provide a light weight, high strength device capable of containing high temperature fluids.

A still additional object of this invention is to provide a high strength, light weight laminated pressure vessel wherein the tendency to cause peeling of the laminations due to excessive shear forces and adverse bending loads is significantly decreased.

Another additional object is to provide a pressure vessel in the form of a composite rocket motor including a laminated liner and nozzle wherein the orientation of the laminations imparts a significantly increased capability thereof to undergo a uniform rate of erosion of the internal surfaces of the liner and nozzle during operation with high temperature and high pressure fluids.

These and other objects and novel features characteristic of the invention will be set forth both as to its organization and method of operation together with advantages and additional objects and will be best understood from the following description of specific embodiments when read in connection with the accompanying drawings in which.

In its broadest aspects the invention comprises a high pressure fluid containing pressure vessel 10 (FIG. 1), having a tubular walled portion 11. Tubular wall 11 consists of a plurality of laminations or layers 12 and is prepared from a rod or hollow tube of resin impregnated material such as paper, cloth and the like, as a base. The resin impregnation is preferably a thermosetting phenolic type well known to the art, although many other thermosetting resins are also well known and contemplated for use herein, for example, epoxy resins, melamine resins, silicone resins and urea-formaldehyde resins. Pressure vessel 10 is fabricated, usually by winding under tension the partially cured (B stage) resin impregnated base, for example, a suitable paper or cloth, on a heated mandrel until a predetermined diameter is obtained, the mandrel being heated to assist in finally curing the resin. After wrapping or winding, the mandrel is removed and the resulting tube is removed to a hot mold-press having suitable fixtures, and heat and pressure applied to radially compress the partially cured tube into a rod of smaller diameter. Sufficient compressive force and heat is applied to form a solid rod and finally cure the resin.

The final result when viewed in longitudinal section, appears as a solid continuous surface, however, the convolutions of impregnated base material are nevertheless present, and though not ordinarily visible, remain as layers or laminations having their edges parallel to each other and to a longitudinal axis through the rod. Alternatively, the layers can be formed in a mold and arranged concentrically to achieve the same parallelism referred to above.

Figure 1:
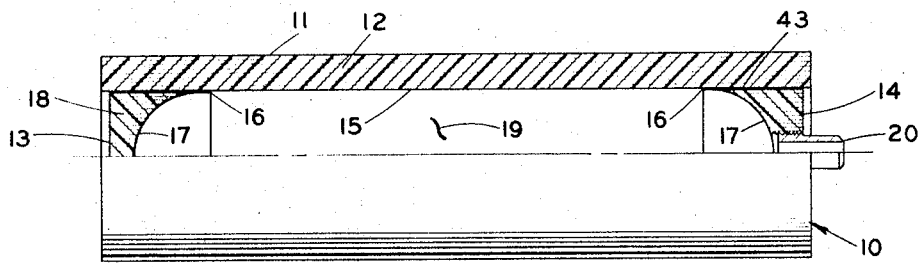
FIGURE 1 is a longitudinal view, partially in section, of a preferred embodiment of the invention.

After compressing and curing, as above described, is completed the rod is cut to a desired length and sufficient material is removed from the center by machining, drilling or gouging to obtain a tube of predetermined inside diameter and wall thickness. Following this all surfaces are treated by grinding, lapping or other surface finishing means or methods to achieve any desired fineness. In FIG. 1 tube 11 is representative of a piece fabricated as above described. Laminations 12 are indicated though not visible to the eye even when viewed under magnification unless the viewed surface is acid etched. To complete the invention of FIG. 1 end closure 13 is prepared from the rod material by cutting or slicing a piece of sufficient length, forming it with a cup-like or concave inner surface 17 and outer surface as shown. The outer surface of end closure 13 is achieved by machining, grinding or other well known means and sized to be insertable within tube 11. Preferably, end closure 13 is made to a diameter for a relatively close fit against the inside surfaces 15 of tube 11 and bonded thereto by means of a high strength epoxy or phenolic resin adhesive 43 which has good flexibility after curing.

Similarly end closure 14 is formed as described with reference to closure 13 with concave inner surface 17. By machining end closures 13 and 14 with contoured or concave surfaces 17, feathered edges or fillets 16 are obtained and combine to give significant force resisting qualities not heretofore obtainable in non-elastic materials. In addition, end closures 13 and 14 are prepared and for best results inserted in tube 11 with their laminations 18 oriented parallel to laminations 12 of tube 11.

Other means of attachment of end closures 13 and 14 in pressure vessel 10 tube 11 (not shown) can also be utilized with good results. Depending upon the pressure of fluid to be contained in the interior 19 thereof, end closures 13 and 14, in addition to bonding by epoxy or phenolic resin 43 or other high strength adhesive, can be fastened by suitable screw threads, clamps and the like. Finally, end closure 14 is drilled to receive a fitting 20 to permit charging and discharging of the vessel with fluid. Fitting 20 as shown is screw threaded in place however, many other methods will occur to a person skilled in the art.

Figure 2:
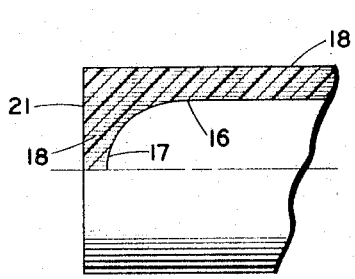
FIGURE 2 is a view, partially in section, of the invention of FIG. 1 showing an additional mode of end closure.
Figure 3:
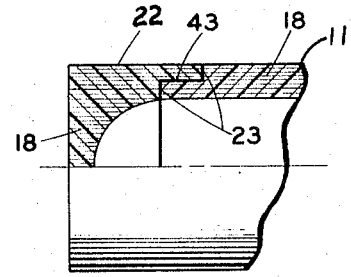
FIGURE 3 is a view similar to FIG. 2 showing an additional mode of end closure.

In FIGS. 2 and 3 two alternate forms of end closures are shown. In FIG. 2 end closure 21 is formed integral with tube 11 by suitably machining or drilling the rod from which vessel 10 is prepared. In this manner, the laminations 12 remain parallel, and the feathered edges or fillets 16 and concave surface 17 are retained. In addition, under stress, the non-elastic material exhibits much of the properties of elastic (metal) materials, as in the FIG. 1 invention.

FIG. 3 end closure 22 is prepared as is end closures 13 and 14 with contoured concave surface 17 and feathered edges 16. End closure 22 is fitted to tube 11 at the end thereof by means of overlapping, abutting joint 23 and held fast by adhesive 43. Other equivalent means can also be utilized for attachment of end closure 22 to tube 11, and such will no doubt occur to a skilled person in the field of the invention. However, the parallelism of laminations 12 and 18, inclusion of feathered edges or fillets 16 and the forming of contoured or concave surfaces 17 are retained along with the ability to simulate the behaviour of elastic material, i.e., metal, under stress, as in FIG. 1 invention. As will be hereinafter explained, maintaining the layer or lamination 12 and 18 parallelism presents a unique and novel effect unobtainable heretofore in the pressure vessel art and is preferred in all embodiments. Broadly, however, the use of a low cost phenolic resin impregnated paper or cotton cloth heretofore used in flat sheets for electrical terminal boards and electrical insulation in appliances, and in tube form in electrical condensers, rectifiers and insulation therefor, as a structural member in pressure vessels and as a heat resisting and an ablative member in rocket motors is also considered inventive as will become more apparent in what follows.

Figure 4:
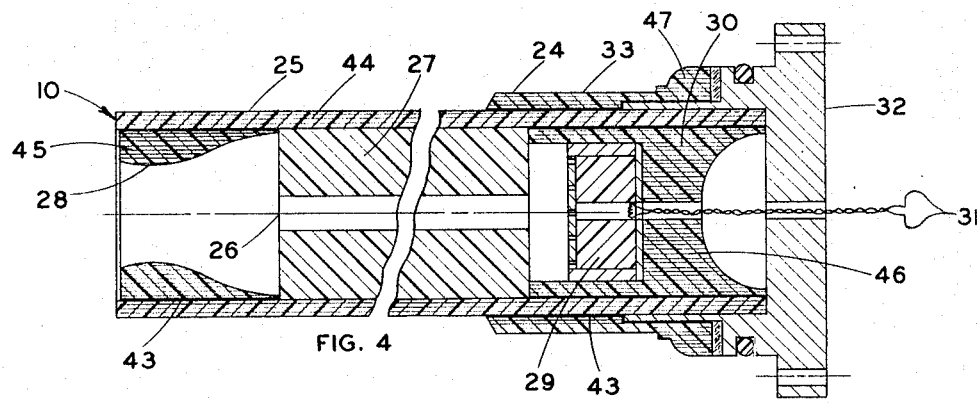
FIGURE 4 is a longitudinal, sectional view of another embodiment of the invention in the form of a rocket motor.

Referring now to FIG. 4 pressure vessel 10 is shown in the form of a rocket motor 24 comprising a tubular member 25 fabricated of laminations or layers 44 enclosing a chamber 26 and containing a solid propellant charge 27. Adjacent to solid propellant charge 27 and communicable with chamber 26 is an opening in the end closure comprising a converging-diverging nozzle 28. Nozzle 28 is also fabricated of laminations or layers 45. To the right of solid propellant charge 27 is a housing 30 containing an ignitable material 29 initiated by an electrical impulse delivered from a suitable source (not shown) through leads 31 and fabricated of laminations or layers 46. Housing 30 is formed with a cavity for receiving and retaining ignitable material 29 and is shaped with a hollowed out portion at its opposite end to conserve material and weight. In addition rocket motor 24 is fitted with a metallic mounting flange 32 for attachment to flying bodies or other vehicles such as aircraft, missiles and the like for propulsion thereof.

Rocket motor 24 with some modification as to size and nozzle design, is also usable as an igniter or gas generator in large rocket motors (not shown) hence mounting flange 32 serves as a means for attachment thereto when so used. Finally a hollow support member 33 fabricated of laminations or layers 47 is installed on tube 25.

By referring to FIG. 4 it will be noted that, with exception of mounting flange 32, ignitable material 29 and propellant 27 all parts are fabricated of laminated material, preferably a phenolic resin impregnated paper. Fabrication of motor 24, which is also a pressure vessel, is similar to the pressure vessel of FIG. 1 in that all laminations in tube 25 support 33, housing 30 and nozzle or end closure 28 are positioned parallel to each other and to a central longitudinal axis of the motor.

Assembly of the various parts comprising motor 24 is preferably accomplished with adhesive of the high strength epoxy or phenolic resin type as indicated at the juncture 43 of the various surfaces shown.

Figure 5:
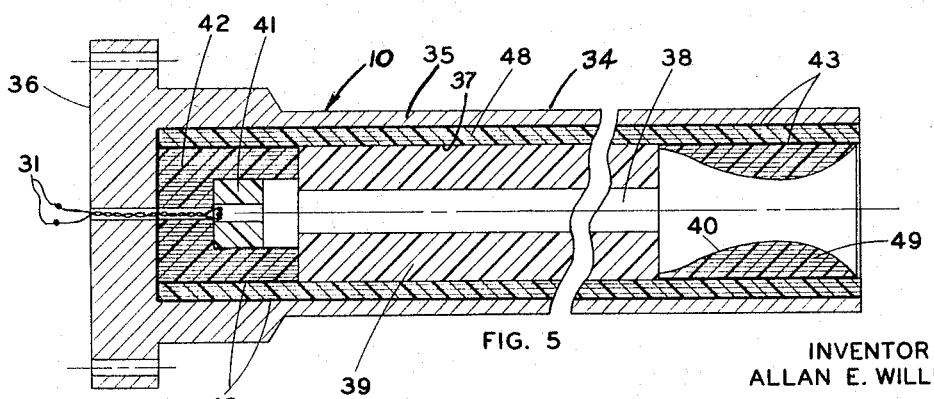
FIGURE 5 is a longitudinal, sectional view of the invention in the form of a composite rocket motor and rocket motor liner.

In FIG. 5 an additional modification of the invention is shown wherein pressure vessel 10 is fabricated as a composite rocket motor 34 comprising an outer metallic shell 35 with integral mounting flange 36, and surrounding a tubular liner 37 comprised of laminations or layers 48. Enclosed within liner tube 37 is a chamber 38 containing a propellant charge 39. To the right of propellant charge 39, and communicable with chamber 30 is a nozzle 40 comprised of laminations or layers 49. To the left of propellant charge 37 is a housing 42 comprised of laminations or layers 50 containing ignitable material 41 and positioned within liner 37 as shown. Ignitable material 41 is initiated by an electrical impulse delivered from a suitable source (not shown) through electrical leads 31.

As indicated for the embodiments described with reference to FIGS. 1 and 4, all parts are laminated and the laminations are preferably made of phenolic resin impregnated paper, cotton cloth or the like, except shell 35, ignitable material 41 and propellant 39, and on assembly are oriented with their laminations parallel to each other and to a central motor longitudinal axis. Assembly is completed by adhesively bonding the parts at their surface junctures with high strength epoxy or phenolic resin compound 43.

In operation of this invention, as constructed, it has been found that a marked increase in ability to withstand high fluid pressure at high (rocket motor) temperature has been achieved. In addition it has been found that the ill effects of the high temperature, highly erosive or ablative gas ensuing from nozzles 28 and 40 of rocket motors 24 and 34, are markedly reduced by the arrangement of the laminated parts as herein described. Erosion or perhaps more correctly, ablation of the material, which is of primary importance and occurs in all rocket motors is the direct result of the movement of high velocity, high temperature gas. By itself the erosive effect is not particularly difficult to overcome if the material of which the motor or nozzle is fabricated is selected for its ability to erode or ablate at uniform, or predictable rates. Most resinous plastics when subjected to the heat and erosive action of high temperature and high velocity gas flowing from a nozzle easily ablate or erode and become charred at the surface exposed to the gas. This charring becomes progressively deeper depending upon the duration of time the surface is exposed, and retains heat until as a result material begins to leave the surface, exposing uncharred material to the hot gas. Further charring results and more material is eroded away, completely changing the dimensional character of the nozzle or motor chamber.

However, in this invention of a rocket motor pressure vessel, fabrication in accordance herewith results in eliminating or sharply mitigating this harmful action. It has been discovered that phenolic resin impregnated paper is capable of eroding or ablating at an even or uniform rate. and when laminations 12 and 18 (FIGS. 1, 2 and 3), 44, 45, 46 and 47 (FIG. 4) and 48, 49 and 50 (FIG. 5) are oriented with their edges (in section) parallel with each other and the pressure vessel 10 longitudinal axis, this capability of even highly uniform ablation rates under high velocity, high temperature gas exposure with little residual heat in the form of a deep char layer is most remarkably demonstrable.

Therefore, what has been brought to the art of pressure vessels whether those useful primarily for storage of high pressure fluid (FIGS. 1, 2 and 3) or in the form of high pressure, high temperature gas producing rocket motors, gas generators, igniters and the like (FIGS. 4 and 5), is a unique and highly useful device, capable of undergoing long exposure to said high pressure and high temperature fluid, of light weight construction and easily fabricated of readily (economically) available materials. Lastly, by this invention, there has been made available to the art of pressure vessels a light weight pressure vessel of the character described having separable end closures, fittings and structural appurtenances of laminations wherein the laminations of all the separate pieces are arranged in a particular manner, whereby a relatively non-elastic material simulates in practice, the behavior of elastic materials such as metal.

It is seen that various changes may be made in the form, structure and arrangement of parts without departing from the spirit of the invention. Therefore what is claimed as new and desired to be secured by Letters Patent of the United States is limited only by scope of the subjoined claims.

What is claimed is:

1. In a pressure vessel having laminated walls and end closures wherein the laminations are preformed, under pressure, of convoluted laminations of resin impregnated base material defining a space therewithin for containing fluid under pressure, the improvement comprising said walls and said end closures arranged with said laminations being parallel to each other and to a central axis of the vessel.

2. A light weight, high strength pressure vessel comprising a tubular wall preformed, under pressure, of a plurality of convoluted laminations of resin impregnated base material, said laminations in section arranged about a central longitudinal axis of said vessel in parallel relationship therewith, at least one end closure connected to one end of said wall preformed, under pressure, of a plurality of convoluted laminations of resin impregnated base material, said laminations arranged about said central longitudinal axis in parallel relation therewith, and said end closure having greater thickness, longitudinally, at said tubular wall than at said pressure vessel center.

3. The pressure vessel of claim 1 wherein at least one end closure is integral with said wall being continuous therewith.

4. The pressure vessel of claim 1 wherein the laminations are concentric about said vessel central axis.

5. The pressure vessel of claim 1 wherein the end closures are individually attached to said wall by an adhesive bond.

6. The pressure vessel of claim 1 wherein the end closures outer surfaces are attached to said wall inner surface.

7. The pressure vessel of claim 1 wherein the end closures are connected to the end portions of said wall by means of an overlapping abutment.

8. The pressure vessel of claim 1 wherein the end closures have internal, contoured, surfaces beginning at said wall and extending to the center of said vessel, and said surface edges are feathered into said wall.

9. A pressure vessel adaptable for use as a rocket motor comprising, an outer tube formed of a plurality of convoluted laminations of resin impregnated base material defining a chamber, at least one end closure having an opening comprising a nozzle in said tube communicable with said chamber and formed of a plurality of convoluted laminations of resin impregnated base material, said tube and nozzle laminations, in section, being parallel to each other and to the longitudinal axis of said motor, a propellant charge in said chamber for producing high temperature and pressure propulsive fluid, means for igniting said propellant charge, and means on said tube for attaching said motor in a vehicle.

10. A composite pressure vessel adaptable for use as a rocket motor comprising an outer metallic shell, a liner in said shell comprised of a plurality of convoluted laminations of resin impregnated base material defining a chamber, an end closure having an opening comprising a nozzle in the liner communicable with the chamber and formed of a plurality of convoluted laminations of resin impregnated base material, said laminations in said liner and said nozzle, in section, being parallel to each other and the longitudinal axis of said motor, a propellant charge in said chamber for producing high temperature and pressure propulsive fluid, means for igniting said propellant charge, and means integral with said shell for mounting said motor in a vehicle.

11. The motor of claim 9 wherein the base material is paper.

12. The motor of claim 9 wherein the base material is cotton cloth.

13. The motor of claim 9 wherein the resin is selected from the group consisting of phenolic resin, melamine resin, epoxy resin, silicone resin and urea-formaldehyde resin.

14. The motor of claim 10 wherein the base material is paper.

15. The motor of claim 10 wherein the base material is cotton cloth.

16. The motor of claim 10 wherein the resin is selected from the group consisting of phenolic resin, melamine resin, epoxy resin, silicone resin and urea-formaldehyde resin.

17. The vessel of claim 1 wherein the resin is selected from the group consisting of phenolic resin, melamine resin, epoxy resin, silicone resin and urea-formaldehyde resin.

18. The vessel of claim 1 wherein the base material is paper.

19. The vessel of claim 1 wherein the base material is cotton cloth.

20. The vessel of claim 2 wherein the resin is selected from the group consisting of phenolic resin, melamine resin, epoxy resin, silicone resin and urea-formaldehyde resin.

21. The vessel of claim 2 wherein the base material is paper.

22. The vessel of claim 2 wherein the base material is cotton cloth.

(References on following page)

References Cited by the Examiner

UNITED STATES PATENTS

| | | | |
|---|---|---|---|
| 1,725,525 | 8/1929 | Kondolf | 229—67 |
| 2,512,797 | 6/1950 | Harvuot | 156—69 X |
| 2,959,001 | 11/1960 | Porter | 60—39.82 X |
| 2,987,880 | 6/1961 | Kimmel | 60—35.6 |
| 3,010,602 | 11/1961 | Randolph | 220—83 |
| 3,017,746 | 1/1962 | Kiphart | 60—35.6 |
| 3,064,423 | 11/1962 | Frey | 60—35.6 X |
| 3,066,484 | 12/1962 | Buchanan et al. | 60—35.6 |
| 3,081,705 | 3/1963 | Warnken | 60—35.6 X |
| 3,095,993 | 7/1963 | Balcom et al. | 220—3 X |
| 3,098,577 | 7/1963 | Dietrich | 220—83 X |
| 3,142,960 | 8/1964 | Bluck | 60—35.6 |

OTHER REFERENCES

"Astrolite," Products Bulletin Number PB 7–24A, H. I. Thompson Fiber Glass Company, July 1, 1959 (pages 1–9 relied on).

CARLTON R. CROYLE, *Primary Examiner.*